Feb. 6, 1940.  J. J. N. VAN HAMERSVELD  2,189,482
MACHINE TOOL
Filed Jan. 19, 1938   5 Sheets-Sheet 1
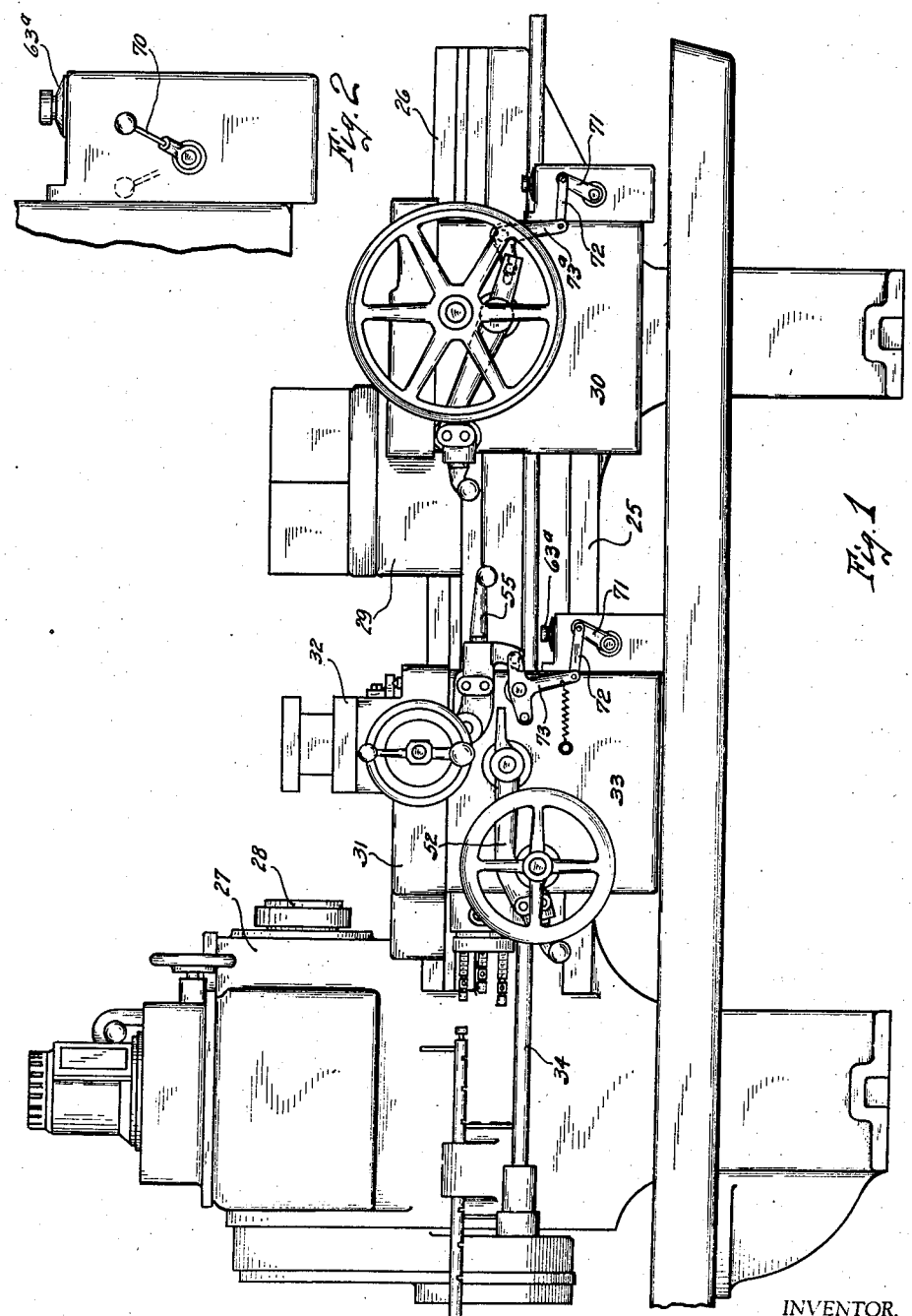
INVENTOR.
JOHN J. N. VAN HAMERSVELD
BY
ATTORNEYS

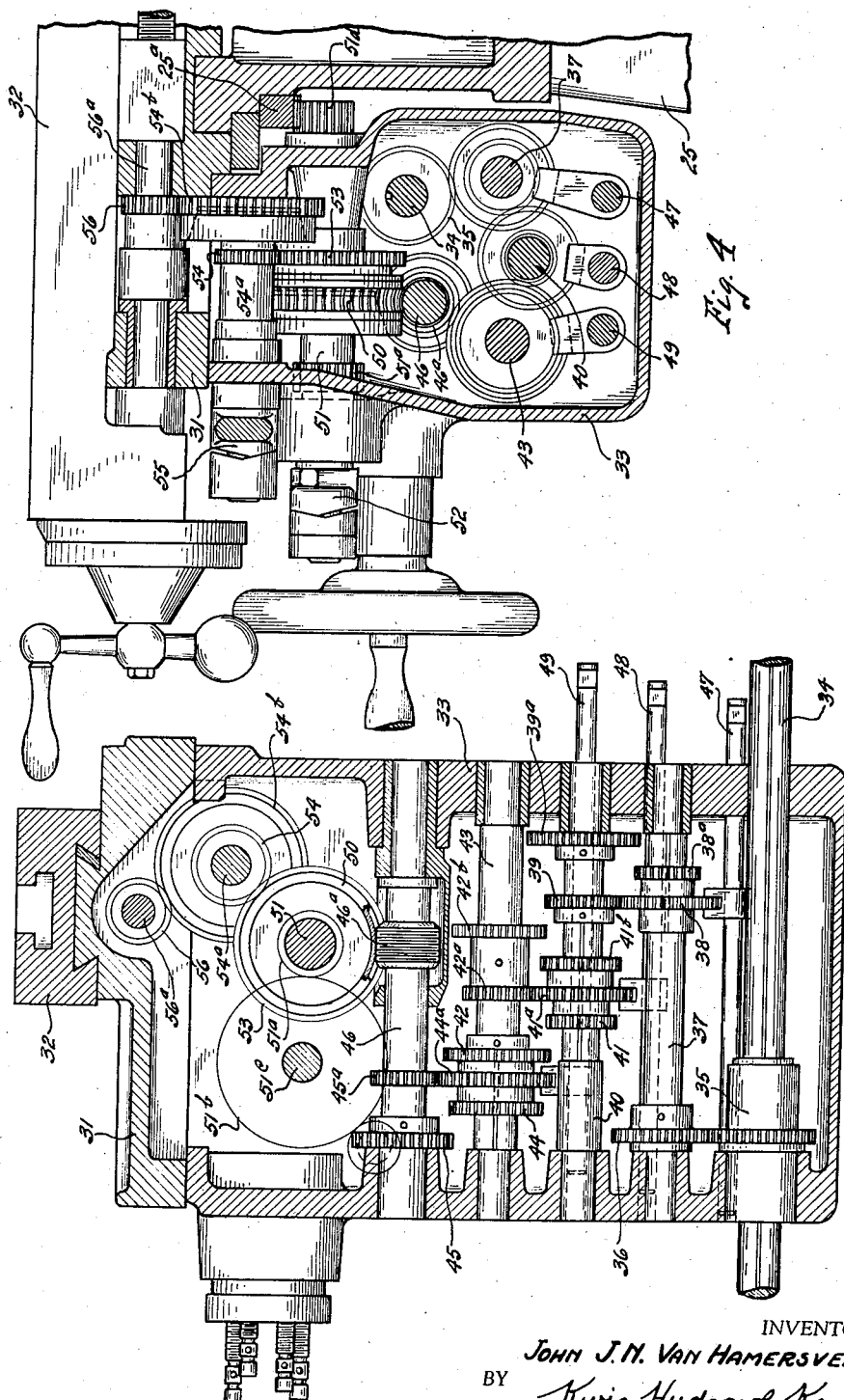

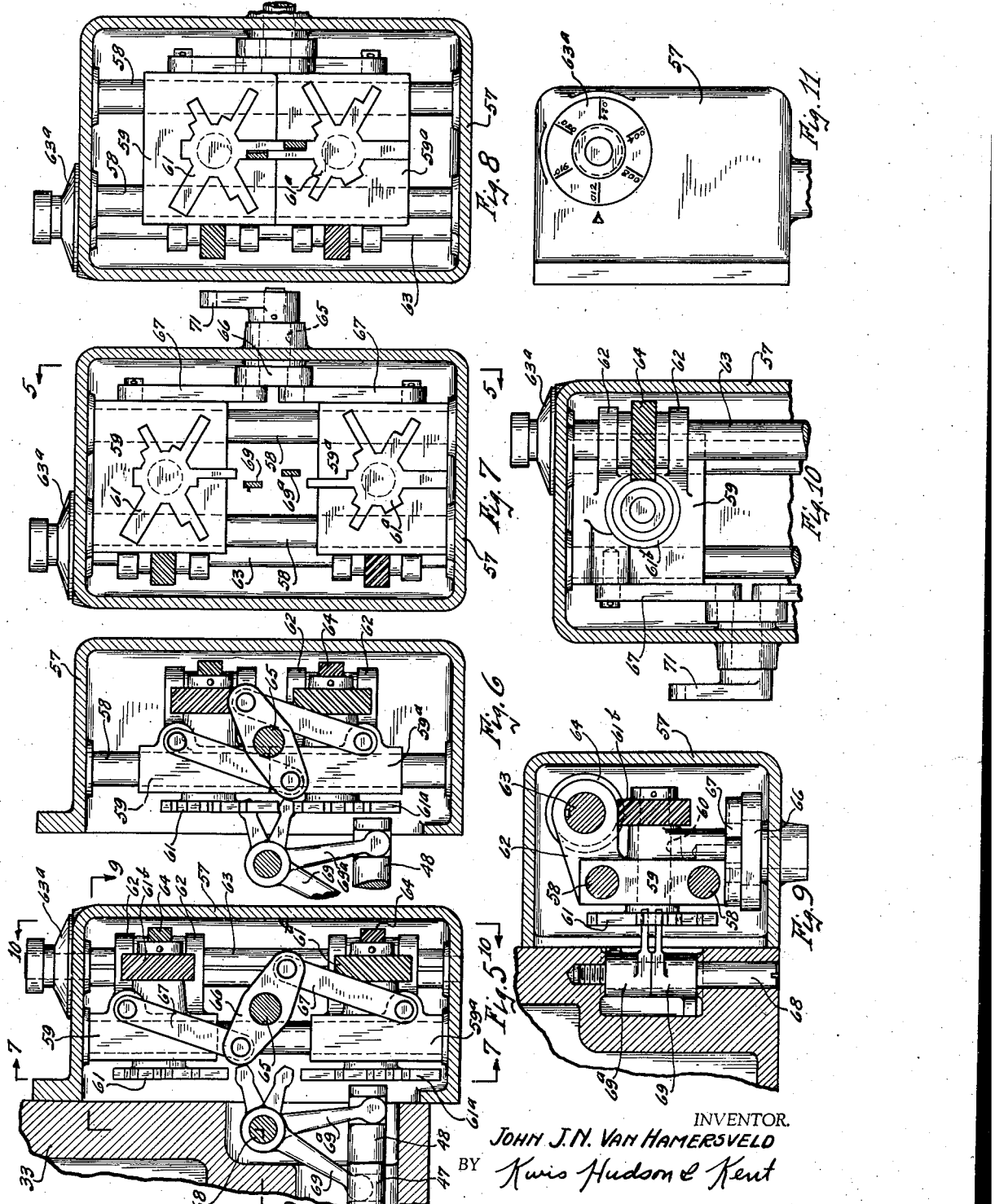

Feb. 6, 1940.   J. J. N. VAN HAMERSVELD   2,189,482
MACHINE TOOL
Filed Jan. 19, 1938   5 Sheets-Sheet 4
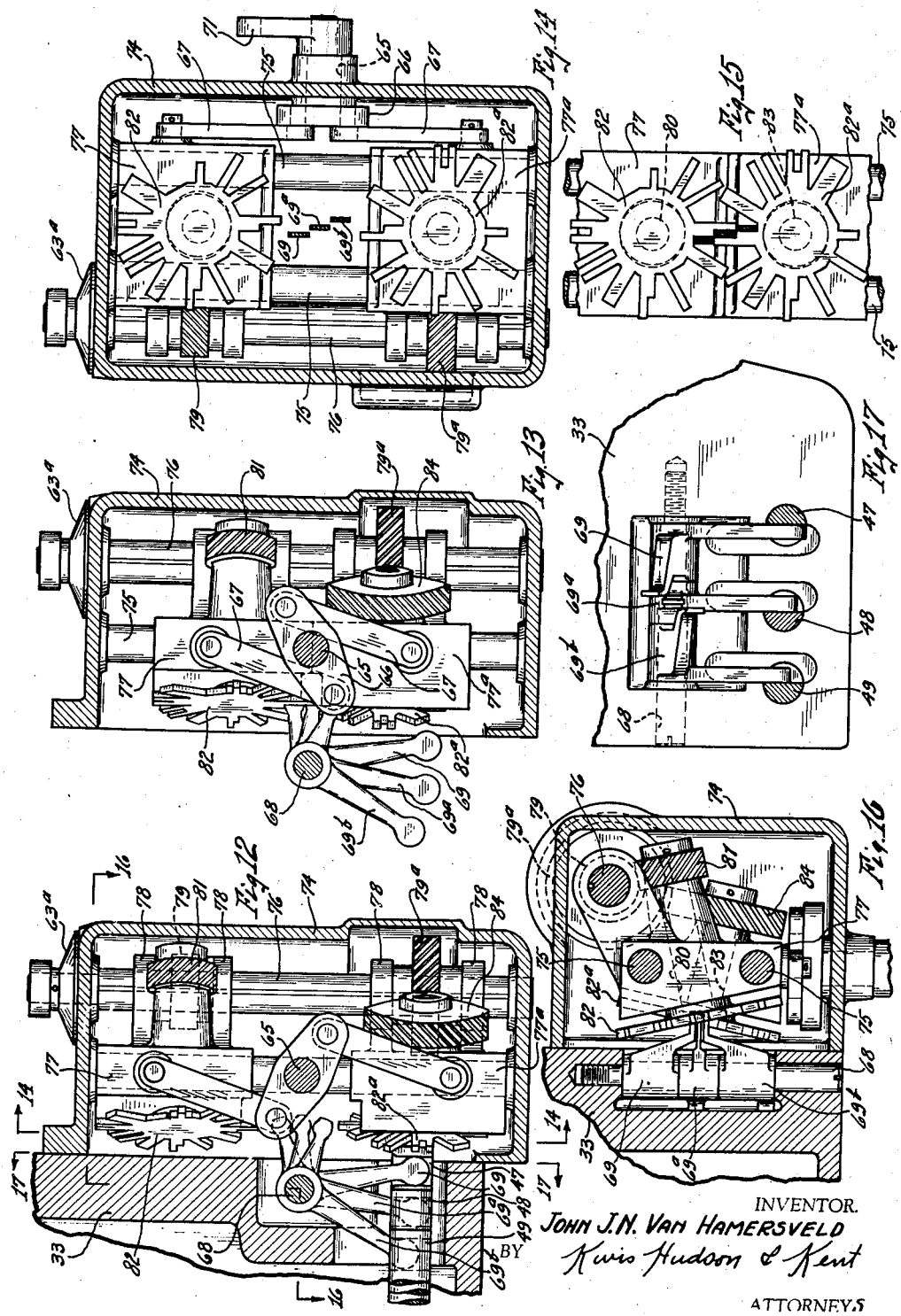
INVENTOR.
John J.N. Van Hamersveld
BY Kwis Hudson & Kent
ATTORNEYS

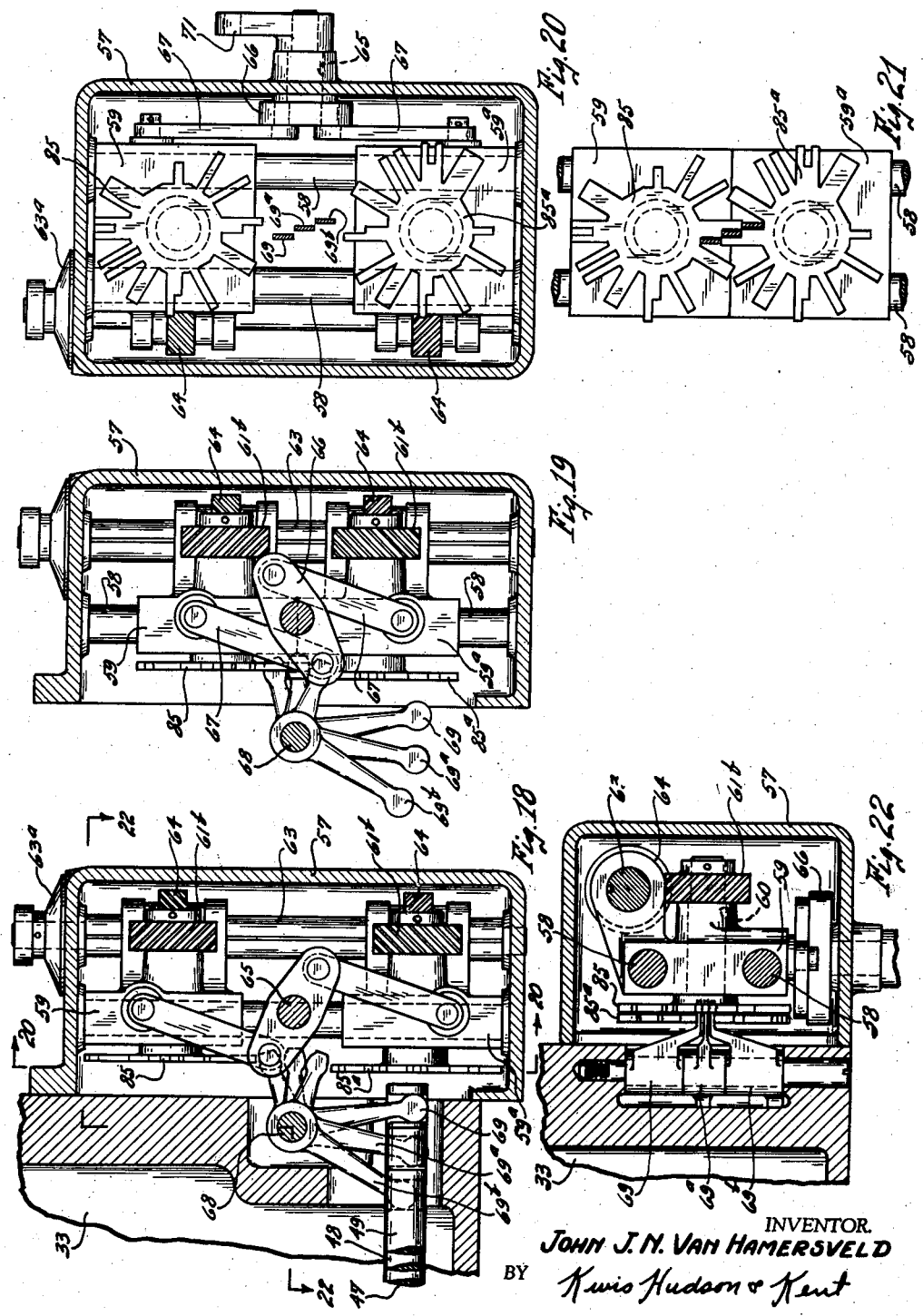

Patented Feb. 6, 1940

2,189,482

UNITED STATES PATENT OFFICE 2,189,482

MACHINE TOOL

John J. N. Van Hamersveld, Cleveland Heights, Ohio, assignor to The Warner & Swasey Company, Cleveland, Ohio, a corporation of Ohio Application January 19, 1938, Serial No. 185,727

26 Claims. (Cl. 29—46)

This invention relates to a machine tool, and particularly to mechanism for selecting or preselecting the rates of movement of a movable part of the machine and for effecting a change of the rate of movement thereof to the preselected rates.

An object of the invention is to provide in a machine tool having a movable part that is given different rates of movement improved mechanism for selecting the various rates of movement to be imparted to said part and for changing the drive for said part to obtain the rates of movement selected.

Another object is to provide in a machine tool having a movable part the rates of movement of which are different during different operative steps of a complete work cycle, improved mechanism for preselecting during one operative step of the work cycle the rate of movement for the next operative step and upon the completion of the current step to obtain the rate of movement for the following step which has thus been preselected.

A further object is to provide in a machine tool mechanism for selecting or preselecting the rates of movement of a movable part of the machine and which mechanism is of such character that it is compact and can be efficiently embodied in locations of limited space and which also can be effectively incorporated in the machine for selecting or preselecting speeds or feeds of the movable parts of the machine tool.

A further object is to provide in a machine tool mechanism for selecting or preselecting the rates of movement of a movable part of the machine and which is of such character that it may readily be adapted to be actuated manually or automatically to obtain the selected or preselected rate of movement of said part.

Further and additional objects and advantages not hereinbefore referred to will become apparent hereinafter during the detailed description which is to follow of several embodiments of the invention.

Referring to the accompanying drawings wherein several embodiments of the invention are illustrated:

Fig. 1 is a front elevational view of a machine tool wherein preselecting mechanisms according to the present invention are shown incorporated in the aprons of the cross slide carriage and turret slide and adapted for automatic actuation upon the completion of the feeding movements.

Fig. 2 is a fragmentary front elevational view of a portion of the apron for either the cross slide carriage or the turret slide and shows the housing for a preselecting mechanism embodying the present invention attached to the apron and said mechanism adapted to be manually actuated.

Fig. 3 is a sectional developed view through the cross slide carriage and apron therefor and the cross slide and shows the change speed gearing for actuating the feed drives to said carriage and cross slide, it being noted that said change speed gearing is arranged to impart twelve different speeds to said feed drives.

Fig. 4 is a view partly in section and partly in elevation of a portion of the bed, cross slide carriage, apron therefor and cross slide.

Fig. 5 is a fragmentary sectional view through a portion of the apron of the cross slide carriage and through one form of the selecting or preselecting mechanism embodying the present invention and is taken substantially on line 5—5 of Fig. 7 looking in the direction of the arrows, it being noted that in this view only two slidable gear shifting rods are shown and that the mechanism is adapted for selecting or preselecting only six different rates of movement.

Fig. 6 is a sectional view similar to Fig. 5, but shows the parts of the selecting or preselecting mechanism in different positions.

Fig. 7 is a sectional view taken substantially on line 7—7 of Fig. 5 looking in the direction of the arrows.

Fig. 8 is a view similar to Fig 7, but showing the parts in different position.

Fig. 9 is a sectional view taken on the irregular line 9—9 of Fig. 5 looking in the direction of the arrows.

Fig. 10 is a fragmentary sectional view taken on line 10—10 of Fig. 5 looking in the direction of the arrows.

Fig. 11 is a top plan view of the housing of the selecting or preselecting mechanism shown in Fig. 5 to 10 inclusive and shows the indexing and indicating dial for said mechanism.

Fig. 12 is a view similar to Fig. 5 but illustrating a different form of selecting or preselecting mechanism, it being noted that in this view three slidable gear shifting rods are indicated and that the mechanism is adapted for selecting or preselecting twelve different rates of movement.

Fig. 13 is a view similar to Fig. 12 but shows the parts of the mechanism in a different position.

Fig. 14 is a sectional view taken subsequently on line 14—14 of Fig. 12 looking in the direction of the arrows.

Fig. 15 is a fragmentary view similar to Fig. 55

14 but shows the parts of the mechanism in a different position.

Fig. 16 is a sectional view taken substantially on irregular line 16—16 of Fig. 12 looking in the direction of the arrows.

Fig. 17 is a fragmentary sectional view taken substantially on line 17—17 of Fig. 12 looking in in the direction of the arrows.

Fig. 18 is a view similar to Figs. 5 and 12 but shows a different form of selecting or preselecting mechanism and which is adapted to select or preselect twelve different rates of movement.

Fig. 19 is a view similar to Fig. 18 but shows the parts of the mechanism in a different position.

Fig. 20 is a sectional view taken substantially on line 20—20 of Fig 18 looking in the direction of the arrows.

Fig. 21 is a fragmentary view similar to Fig. 20 but shows the parts of the mechanism in a different position, and Fig. 22 is a sectional view taken substantially on irregular line 22—22 of Fig. 18, looking in the direction of the arrows.

The selecting or preselecting mechanisms of the present invention are illustrated herein by way of example as applied to the aprons of the cross slide carriage and turret slide for selecting or preselecting the rates of feeding movement of the slides of the machine. The mechanisms are also illustrated as operatively associated with the feed control levers for automatically obtaining the selected or preselected rates of feeding movement upon the completion of the prior rates of feeding movement in a manner corresponding to that shown and claimed in my copending application Serial No. 182,104, filed December 28, 1937.

Although the selecting or preselecting mechanisms have been shown herein applied to the change speed gearing in the aprons of the cross slide carriage and turret slide, it will be understood that such illustration is merely by way of example and that said mechanisms could effectively and readily be utilized in connection with the change speed gearing in the head for selecting or preselecting the different spindle speeds.

Referring to Fig. 1, the invention is shown applied to the aprons of the cross slide carriage and turret slide of a turret lathe and which comprises the usual bed 25 provided with longitudinally extending ways 26 and having at one end a head 27 in which is mounted the usual work or tool spindle 28 that can be driven at a plurality of different speeds by suitable change speed gearing as is well understood in the art. A turret slide 29 is mounted on the ways 26 of the bed for movement longitudinally thereof and is provided at its front side with an apron 30. Intermediate the turret slide 29 and the head 27 there is slidably mounted on the ways 26 a cross slide carriage 31 that has a cross slide 32 and is provided at its front side with an apron 33.

The turret slide 29, cross slide carriage 31 and cross slide 32 are moved for purposes of feeding by means of a feed shaft 34 that extends longitudinally of the front of the bed and is operatively connected at one of its ends through suitable gearing with the work spindle 28, as will be well understood in the art. The feed shaft 34 is operatively connected with the turret slide 29, the cross slide carriage 31 and the cross slide 32 by means of suitable drive trains mounted in the turret slide apron 30 and in the cross slide carriage apron 33, as will also be understood and which will later be explained more in detail.

Inasmuch as the drive train in the turret slide apron 30 and which operatively connects the turret slide 29 with the feed shaft 34 is a substantial duplicate of the drive train in the cross slide carriage 33 when the power drive for the cross slide is omitted, it will only be necessary to explain herein in detail the drive train in the cross slide carriage apron 33 and for this purpose reference may be had particularly to Figs. 3 and 4 of the drawings.

The feed shaft 34 extends through the apron 33 of the cross slide carriage and there is splined on the shaft 34 for rotation therewith and relative endwise movement thereon a gear sleeve 35, it being understood, however, that said gear sleeve does not have endwise movement relative to the apron. The gear 35 is in constant mesh with a gear 36 fixed to a shaft 37 rotatably mounted in the apron, and said shaft has splined thereon for rotation therewith a shiftable two-step gear cone formed of the gears 38 and 38a.

The gear 38 is adapted to be meshed with a gear 39 fixed on a shaft 40, while the gear 38a is adapted to be meshed with a gear 39a also fixed on the shaft 40, wherefore it will be seen that the shaft 40 can be driven from the shaft 35 at either one of two speeds. A three-step shiftable gear cone is splined on the shaft 40 for rotation therewith and comprises the gears 41, 41a and 41b.

The gear 41 is adapted to be meshed with a gear 42 fixed to a shaft 43, while the gears 41a and 41b are adapted to be meshed, respectively, with gears 42a and 42b also fixed to the shaft 43. It will be seen that the shaft 43 can be driven from the said shaft 34 at any one of six different speeds. A shiftable two-step gear cone is splined on the shaft 43 for rotation therewith, and comprises the gears 44 and 44a with the gear 44 adapted to be meshed with a gear 45 fixed on the shaft 46, while the gear 44a is adapted to be meshed with a gear 45a also fixed on the shaft 46. It will be seen that the shaft 46 can be driven from the feed shaft at any one of twelve different speeds.

The two-step gear cone on the shaft 37 can be shifted to either one of its operative positions by means of a shifting rod 47 carried by the apron and extending beyond the end thereof for a purpose later to be explained, said rod 47 being provided with a fork that straddles the gear 38. The three-step gear cone on the shaft 40 is shifted by means of a shifting rod 48 carried by the apron and also extending beyond the end thereof and provided with a fork that straddles the gear 41a. The two-step gear cone on the shaft 43 is shifted by means of the shifting rod 49 likewise carried by the apron and extending beyond the end thereof and provided with a fork that straddles the gear 44a.

The shaft 46 is provided with a worm 46a that meshes with a worm wheel 50 forming the outer part of a friction clutch that is mounted on a shaft 51 extending transversely of the machine and provided at the front side of the apron with a feed control lever 52, whereby the clutch is engaged and disengaged to connect or disconnect the feed drive for the cross slide carriage. A small gear 51a is fixed on the shaft 51 and meshes with a gear 51b on a shaft 51c and extending transversely of the apron and having fixed to its rear end a pinion 51d that meshes with the rack 25a fixed to the bed 25.

A gear 53 formed integral with the worm wheel 50 meshes with a gear 54 mounted on the shaft 54a and forming the inner part of a friction clutch that is controlled by a feed control lever 55 secured to the shaft at the front of the apron. A gear 54b is formed integral with the outer member of the friction clutch on the shaft 54a and meshes with a gear 56 that drives the feed screw 56a for the cross slide, as is well understood in the art.

The feed drive trains for the cross slide carriage and the cross slide as just described, including the clutches therein and the feed control levers therefor, are conventional and well understood in the art and need not be further described herein, particularly since a full description thereof is set forth in my said copending application Serial No. 182,104.

As previously stated, the shifting rods 47, 48 and 49 project beyond an end of the apron. In the form of selecting and preselecting mechanism illustrated in Figs. 5 to 11 inclusive, however, it will be noted that only two of the rods, namely, 47 and 48, are shown projecting beyond the end of the apron, since the selecting or preselecting mechanism illustrated in these views is adapted for a six speed change speed gearing rather than the twelve speed shown in Figs. 3 and 4, and hence the upper shiftable rod 49 is omitted, it being understood that the two-step gear cone on the shaft 43 is omitted also and a fixed gear substituted that constantly meshes with a gear on the shaft 46.

The selecting or preselecting mechanism shown in Figs. 5 to 11 inclusive is contained in a housing 57 secured to the end of the apron 33. The selecting or preselecting mechanism comprises a pair of parallel vertical rods 58 fixed in the housing 57 and slidably supporting substantially rectangular upper and lower slide members 59 and 59a. Each of the slides 59 and 59a is provided with a bore forming a bearing and in which is rotatably mounted a shaft 60. The shaft 60 on slide 59 carries on one end a cam disk 61 and on the opposite end a spiral gear 61b, while the shaft 60 on slide 59a carries on one end a cam disk 61a and on the opposite end a spiral gear 61b.

The slides 59 and 59a are also each provided with a pair of spaced laterally extending ears 62 that have openings therein through which extends a rotatable spline shaft 63 and that extends vertically of the housing parallel to the rods 58 and has fixed to its upper end above the housing an operating dial 63a. Intermediate the ears of each pair of ears 62 there is splined on the shaft 63 a spiral gear 64 that meshes with the gear 61b on the adjacent shaft 60. It will be seen that rotation of the dial 63a will cause through the gears 64 and 61b a rotation of both shafts 60 and both cam disks 61 and 61a at an equal rate, wherefore said cam disks can be indexed by the dial 63a to any predetermined position. Suitable spring points (not shown) may be employed to hold the disks in their various indexed positions.

The slides 59 and 59a are moved toward and away from each other on the rods 58 by the following mechanism: In the front wall of the housing 57 there is rockably mounted in a suitable bearing boss a shaft 65 which has fixed to its inner end an equalizing bar 66. The bar 66 in turn has its opposite ends pivotally connected to one of the ends of links 67, the opposite ends of which are pivotally connected to the slides 59 and 59a, respectively.

It will be seen that when the shaft 65 is rocked in one or the other direction the slides 59 and 59a will be moved equally on the rods 58 either toward or away from each other as the case may be. In other words the slides can be moved from the position shown in Figs. 5 and 7 to the position shown in Figs. 6 and 8, respectively.

A short shaft 68 is fixed in a recessed portion of the wall of the apron and has rockably mounted thereon a pair of bell crank levers 69 and 69a. The long arms of these levers project downwardly and are provided at their lower ends with rounded portions fitting into slots formed adjacent the ends of the shifting rods 47 and 48 respectively. The short arms of the bell crank levers 69 and 69a project into the housing 57 and have their ends located in the plane of the cam disks 61 and 61a.

It will be seen that when the levers 69 and 69a are rocked on the shaft 68 the shifting rods 47 and 48 will be moved inwardly or outwardly to shift the gear cones with which they are operatively associated, as will be clearly seen by reference to Fig. 3.

As previously stated, the ends of the short arms of the bell crank levers 69 and 69a lie in the plane of the cam disks 61 and 61a and these disks are provided on their circumferences with a plurality of pairs of long and short projections, short and long projections and projections of equal length. The pairs of projections on the cam disks 61 and 61a correspond in number to the number of different rates of feeding movement to be imparted to the cross slide carriage or to the cross slide.

It will be seen that when said cam disks are given an equalized indexing movement by the rotation of the dial 63a various pairs of projections will be brought into line with the ends of the short arms of the bell crank levers 69 and 69a, see Fig. 7, wherefore, when the slides 59 and 59a are given an equalized linear movement toward each other from the position shown in Fig. 7 to the position shown in Fig. 8, said pairs of projections will contact with the inner ends of the arms of the bell crank levers, cause a rocking movement of said levers and a linear movement of the shifting rods 47 and 48 to shift the slidable gear cones with which said rods are associated.

The cam disks 61 and 61a can only be indexed in their most outward position, that is the position shown in Fig. 7, as otherwise the short arms of the bell crank levers would offer interference. Therefore, when the cam disks have been moved inwardly to the position shown in Fig. 8 to effect a change in the change speed gearing, the slides 59 and 59a must first be moved to their outer positions, i. e., position of Fig. 7 before the dial 63a can be rotated to index the disks. It will be understood that suitable spring points may be provided to hold the shifting rods 47 and 48 in the different positions to which they have been moved by the cam disks.

The endwise movement of the slides 59 and 59a may be imparted thereto by means of a manually operated lever 70 fixed to the outer end of the shaft 65, as indicated in Fig. 2, or it can be imparted thereto by means of the lever 71 secured to the outer end of the shaft 65, as indicated in Figs. 7 or 10, and which lever has its outer end pivotally connected to a link 72 which, in turn is pivotally connected to the end of the long arm of a three armed lever 73 that is operatively associated with the feed control levers, as described in my said copending application Serial No. 182,104 see Fig. 1.

Also the lever 71 may be operatively associated through the link 72 with a bell crank lever 73a that is operatively associated with the feed control lever of the turret slide, as indicated in Fig. 1 and which arrangement is also shown and described in said copending application.

It will be noted that the mechanism hereinbefore described can be used either as a selecting mechanism or as a preselecting mechanism to select or preselect the different rates of feeding movement for the cross slide carriage or cross slide and also for the turret slide.

When used as a selecting mechanism the dial 63a is not rotated to index the cam disks until the termination of a feeding movement of the carriage or cross slide. Upon the termination of such feeding movement the dial is turned to index the disks and then the slides 59 and 59a are moved inwardly toward each other to change to the selected rate of movement by means of the manually operated lever 70 as shown in Fig. 2, and after the change to the selected rate has been thus obtained the slides are moved to their most outward position by restoring the lever 70 to its original position.

Of course with the arrangement shown in Fig. 2 it would also be possible to preselect the rate of feeding movement, that is when the carriage or cross slide is traveling through a feeding movement the dial 63a could be turned to index the cam disks to a position for obtaining the next rate of movement to be used, and then upon the completion of the prior feeding movement the lever 70 could be manually moved to bring the slides toward each other to effect a change to the preselected rate of movement.

In the arrangement shown in Fig. 1 the dial 63a is rotated during one feeding movement of the cross slide carriage or cross slide to index the cam disks to preselect the next rate of feeding movement and then when the carriage or cross slide has completed such prior feeding movement the slides 59 and 59a are automatically brought inwardly to obtain the preselected rate of movement due to the operative association of the lever 71 with the feed control levers 52 and 55.

In Figs. 12 to 15 inclusive there is illustrated a different form of selecting or preselecting mechanism embodying the present invention, and this form is shown as used in connection with the selecting or preselecting of twelve different rates of feeding movement, and, therefore, the three shifting rods 47, 48 and 49 are employed since the three shiftable gear cones will be used in the change speed gearing in the apron.

Also there will be mounted on the shaft 68 in addition to the bell crank levers 69 and 69a a third bell crank lever 69b, and the inner ends of the short arms of all these levers will project into the housing 74 of the selecting or preselecting mechanism.

The mechanism contained in the housing 74 comprises a pair of vertically extending spaced parallel rods 75 similar to the rods 58 and a rotatable spline shaft 76 extending parallel to the rod 75 and corresponding to the spline shaft 63. The spline shaft 76 is rotated by means of the dial 63a fixed to the upper end of the shaft which projects outwardly of the housing.

As in the previous form of the invention a pair of substantially rectangular slides 77 and 77a are provided with openings through which the rods 75 extend, and these slides are adapted to be moved on the rods toward and away from each other, as will later become clear. The slides 77 and 77a are each provided with spaced laterally projecting pairs of ears 78 similar to the ears 62 and having aligned openings therein through which extends the spline shaft 76. Intermediate the ears 78 of the slide 77 a small spiral gear 79 is splined on the shaft 76 while between the ears 78 of the slide 77a a large spiral gear 79a is splined on the shaft 76.

The side of the slide 77 adjacent to the apron is inclined or angularly disposed, as clearly indicated in Fig. 16, and a bearing boss extends from the opposite side of said slide at right angles to said inclined face. A shaft 80 is mounted in this bearing boss and in an aligning opening in the slide and is provided on one end with a small spiral gear 81 that meshes with the spiral gear 79 (see Fig. 16). On its opposite end the shaft 80 has fixed thereto a cam disk 82 that is arranged parallel to the adjacent inclined face of the slide.

The slide 77a also has its face adjacent to the apron inclined or disposed at an angle and the angular disposition of this face is opposite to the angular disposition of the inclined face of the slide 77. The opposite side of the slide 77a is likewise provided with a bearing boss that extends perpendicularly to the angularly disposed face of the slide and rotatably supports a shaft 83 that has fixed on one end thereof a large spiral gear 84 and on its opposite end a cam disk 82a (see Fig. 16).

It will be noted that the planes of the cam disks 82 and 82a are angularly disposed with respect to each other because of the fact that each cam disk is provided with twelve groups of long and short projections, short and long projections and projections of equal length, and therefore the cam disks must be angularly disposed or displaced in order to prevent interference between the inactive projections thereof when the cam disks are brought to their most inward positions to obtain the selected or preselected rate of movement.

It will also be seen that the shafts 80 and 83 are each rotated by the shaft 76 with a one-to-one ratio, and, therefore, when the dial 63a is rotated the cam disks 82 and 82a will be given an equalized indexing movement. It will also be understood that in this form of the invention the dial 63a will be provided with twelve graduations in place of the six graduations appearing on the dial, as shown in Fig. 11.

The slides 77 and 77a are moved inwardly and outwardly with an equalized movement by the same mechanism previously described in connection with the form shown in Figs. 5 to 11 inclusive, and, therefore, the same reference characters are applied to the corresponding parts.

It will further be understood that the inward and outward movement of the slides 77 and 77a can be obtained by means of a manually operated lever, such as the lever 70 shown in Fig. 2. It will likewise be noted that the short arms of the bell crank levers 69, 69a and 69b are displaced with respect to the long arms of the levers so that their inner ends will be closely adjacent to one another as shown in Figs. 14, 16 and 17 and will lie in the correct relationship with respect to the groups of projections on the cam disks 82 and 82a.

In Figs. 18 to 22 inclusive there is also disclosed another form of the invention adapted for selecting or preselecting twelve different rates of movement for the cross slide carriage, cross slide or turret slide and this form corresponds substantially to the form previously described and which is illustrated in Figs. 5 to 11 inclusive, with the exceptions now to be pointed out.

The fact that twelve speeds are selected or preselected by this form of the invention requires a displacement of the cam disks 85 and 85a, since otherwise some of the inactive groups of projections on the disks would interfere with each other when the slides are brought to their most inward position, see Fig. 21, to obtain the selected or preselected rate of movement.

In place of arranging the disks with their planes disposed angularly, as in the form previously described and illustrated in Figs. 12 to 17 inclusive, the cam disks 85 and 85a have their planes arranged parallel, but off-set with respect to each other, and this merely requires making the shaft that carries the disk 85a longer than the shaft that carries the disk 85 so that the disk 85a is positioned in a plane spaced or off-set from the plane of the disk 85.

Also in this form of the invention the three bell crank levers 69, 69a and 69b are used on the shaft 68 as is the case in the form shown in Figs. 12 to 17, and the inner ends of the short arms of these levers are so shaped and disposed as to lie in operative relationship with respect to the active groups of projections on the cam disks 85 and 85a, as indicated in Figs. 19, 20, 21 and 22. Otherwise this form of the invention corresponds in structure to the form shown in Figs. 5 to 11 inclusive, and, therefore, the same reference characters have been employed to indicate the corresponding parts, it being understood that the slides 59 and 59a when used in this form of the invention can be moved inwardly or outwardly by means of the manual control lever 70 in place of the lever 71. It will also be understood that the dial 63a will in this instance, as in the last described instance, be provided with twelve graduations rather than six graduations.

It will be understood that although the different embodiments of the invention have been described as employed upon the apron of the cross slide carriage they could equally as well be employed upon the apron of the turret slide as indicated in Fig. 1.

Likewise, it will be understood that a selecting or preselecting mechanism embodying any of the forms of the invention could readily be adapted and used in the head stock of a machine tool for selecting or preselecting the speeds of the tool or work spindle, but that for the sake of brevity the different forms of invention herein illustrated have been shown applied only to the aprons of the cross slide carriage or the turret slide to shift the gearing contained therein.

Although several embodiments of the invention have been illustrated and described herein, it will be understood that the invention is susceptible to various modifications and adaptations within the scope of the appended claims.

Having thus described my invention I claim:

1. In a machine tool having a movable part, and change speed means for moving said part at different rates; mechanism for selecting the different rates of movement for said part and operatively associated with said change speed means and including a pair of members, means for rotatably supporting said members on radially spaced axes, said members being provided with cooperating portions arranged substantially in the plane of revolution of said members.

2. In a machine tool having a part to be moved, and change speed means for moving said part at different rates of movement; mechanism for selecting the different rates of movement of said part operatively associated with said change speed means and including a pair of disks, means for rotatably supporting said disks on radially spaced axes, said disks having cooperating portions extending radially from the circumferences thereof.

3. In a machine tool having a movable part and change speed means for moving said part at different rates of movement; mechanism for selecting the different rates of movement of said part operatively associated with said change speed means and including a pair of disks, means for rotatably supporting said disks on radially spaced axes, said disks having on their circumferences radially disposed groups of projections of varying length.

4. In a machine tool having a movable part and change speed means for moving said part at different rates of movement; mechanism for selecting the different rates of movement of said part and operatively associated with said change speed means and including a pair of disks, means for rotatably supporting said disks on radially spaced axes, said disks having cooperating radially disposed portions on their circumferences, and means for moving the supporting means for said disks radially toward and away from each other.

5. In a machine tool having a movable part and change speed means for moving said part at different rates of movement; mechanism for selecting the different rates of movement of said part operatively associated with said means and including a pair of disks, means for rotatably supporting said disks on radially spaced axes, said disks having cooperating radially disposed portions on their circumferences, and a pair of slides carrying said last named means for moving the same radially toward and from each other.

6. In a machine tool having a part to be moved and change speed means for moving said part at different rates; mechanism for selecting the different rates of movement of said part operatively associated with said change speed means and including a pair of slides movable toward and from each other, rotatable shafts carried by said slides with their axes disposed transverse to the direction of movement of the slides, and members mounted on said shafts and having cooperating camming portions.

7. In a machine tool having a part to be moved and change speed means for moving said part at different rates of movement; mechanism for selecting the different rates of movement of said part operatively associated with said change speed means and including a pair of disks, means for rotatably supporting said disks on radially spaced axes, said disks having cooperating portions extending radially from the circumferences thereof, and means for rotating said disks through predetermined relative distances with respect to each other.

8. In a machine tool having a movable part and change speed means for moving said part at different rates of movement; mechanism for selecting the different rates of movement of said part and operatively associated with said change speed means and including a pair of disks, means for rotatably supporting said disks on radially spaced axes, said disks having cooperating radially disposed portions on their circumferences, means for rotating said disks through predetermined relative distances with respect to each other, and movable means for moving the supporting means radially toward and away from each other.

9. In a machine tool having a part to be moved and change speed means for moving said part at different rates; mechanism for selecting the different rates of movement of said part operatively associated with said change speed means and including a pair of supports movable toward and from each other in a predetermined plane, camming members carried by said supports and movable therewith in said plane, and means carried by said supports for mounting said camming members for rotation about radially spaced axes.

10. In a machine tool having a movable part and change speed means for moving said part at different rates of movement; mechanism for selecting the different rates of movement of said part and operatively associated with said change speed means and including a pair of camming members, means for rotatably supporting said members on radially spaced axes, and means for moving said members toward and from each other and radially with respect to said axes, said members being rotatable and movable toward and from each other in a comon plane.

11. In a machine tool having a movable part and change speed means for moving said part at different rates of movement; mechanism for selecting the different rates of movement of said part and operatively associated with said change speed means and including a pair of camming members, means for rotatably supporting said camming members about radially spaced axes, and means for moving said members radially toward or away from each other, said members being both rotatable and movable toward and from each other in parallel planes.

12. In a machine tool having a movable part and change speed means for moving said part at different rates of movement; mechanism for selecting the different rates of movement of said part operatively associated with said means and including a pair of camming members, means for rotatably supporting said members about radially spaced angularly disposed axes whereby said members have their planes of revolution angularly disposed, and means for moving said camming members radially toward and away from each other.

13. In a machine tool having a part to be moved and change speed means for moving said part at different rates of movement; mechanism for selecting the different rates of movement of said part operatively associated with said change speed means and including a pair of disks having a plurality of cooperating groups of camming portions, and means mounting said disks for rotation about radially spaced axes and for movement radially toward and from each other.

14. In a machine tool having a part to be moved and change speed means for moving said part at different rates of movement; mechanism for selecting the different rates of movement of said part and including shiftable members operatively associated with said change speed means, and a pair of disks provided with a plurality of cooperating groups of camming portions each group of which is adapted to actuate said shiftable members, and means mounting said disks for rotation about radially spaced axes and for movement radially toward and from each other.

15. In a machine tool having a part to be moved and change speed means for moving said part at different rates; mechanism for selecting the different rates of movement of said part operatively associated with said change speed means and including a pair of slides movable toward and from each other, means for moving said slides with an equalized movement, rotatable shafts carried by said slides with their axes disposed substantially transverse to the direction of movement thereof, members mounted on said shafts and having cooperating camming portions, and means for rotating said shafts and members through predetermined relative arcs with respect to each other.

16. In a machine tool having a part to be moved and change speed means for moving said part at different rates; mechanism for selecting the different rates of movement of said part operatively associated with said change speed means and including a pair of slides movable toward and from each other, means for imparting equalized movement to said slides, rotatable shafts carried by said slides with their axes disposed substantially transverse to the direction of movement thereof, disks mounted on said shafts and having cooperating radially disposed camming portions on their circumferences, and a common means for simultaneously rotating said shafts and disks through predetermined relative arcs with respect to each other.

17. In a machine tool having a part to be moved and change speed means for moving said part at different rates; mechanism for selecting the different rates of movement of said part and including a pair of disks having cooperating radially disposed projections on their circumferences, means for rotatably supporting said disks about radially spaced axes, shiftable members operatively associated with said change speed means, and means operatively associated with said members and having portions adapted to be operatively engaged by said radially disposed projections on said disks.

18. In a machine tool having a movable part and change speed means for moving said part at different rates of movement; mechanism for selecting the different rates of movement of said part and including a pair of disks having cooperating radially disposed projections on their circumferences, means for rotatably supporting said disks about radially spaced axes, shiftable members operatively associated with said change speed means, means operatively associated with said shiftable members and having portions extending intermediate said disks, and means for moving said disks radially to bring the projections thereon into engagement with said portions.

19. In a machine tool having a part to be moved and change speed means for moving said part at different rates; mechanism for selecting during the movement of said part at one rate the next rate of movement to be imparted thereto and including a pair of disks, means for rotatably supporting said disks about radially spaced axes, said disks having cooperating projections on their circumferences.

20. In a machine tool having a part to be moved change speed means for having said part at different rates of movement; mechanism for selecting during the movement of said part at one rate the next rate of movement to be imparted thereto and including a pair of disks, means rotatably supporting said disks about radially spaced axes, said disks having cooperating portions on their circumferences, and means for moving said disks toward and from each other and angularly with respect to their axes.

21. In a machine tool having a movable part and change speed means for moving said part at different rates of movement, mechanism for selecting the different rates of movement of said part and operatively associated with said change speed means and including a pair of means indexibly supporting said camming members, and means for moving said members toward and from each other in different planes.

22. In a machine tool having a movable part and change speed means for moving said part at different rates of movement, mechanism for selecting the different rates of movement of said part and operatively associated with said change speed means and including a pair of means indexibly supporting said camming members and means, for moving said members toward and away from each other in parallel laterally off-set planes.

23. In a machine tool having a movable part and change speed means for moving said part at different rates of movement, mechanism for selecting the different rates of movement of said part operatively associated with said means and including a pair of means indexibly supporting said camming members, and means for moving said members toward and from each other in angularly disposed planes.

24. In a machine tool having a movable part and change speed means for moving said part at different rates of movement, mechanism for selecting the different rates of movement of said part and operatively associated with said change speed means and including a pair of disks, means for rotatably supporting said disks about radially spaced axes, said disks having radially extending camming portions on their circumferences, and means for simultaneously rotating said disks through predetermined equal arcs.

25. In a machine tool having a part to be moved and change speed means for moving said part at different rates, mechanism for selecting the different rates of movement of said part operatively associated with said change speed means and including a pair of slides movable toward and from each other, means for imparting equalized movement to said slides, rotatable shafts carried by said slides with their axes disposed transversely to the direction of movement thereof, disks mounted on said shafts and having cooperating radially disposed camming portions on their circumferences, a rotatable shaft disposed laterally of said slides, gearing carried by said last named rotatable shaft and intermeshing with gearing on the first named rotatable shafts such that rotation of said last named shaft will impart an equalized rotation to said first named shafts and said disks.

26. In a machine tool having a part to be moved and change speed means for moving said part at different rates, mechanism for selecting the different rates of movement of said part operatively associated with said change speed means and including a pair of slides movable toward and from each other, means for imparting equalized movement to said slides, rotatable shafts carried by said slides with their axes disposed transversely to the direction of movement thereof, disks mounted on said shafts and having cooperating radially disposed camming portions on their circumferences, a rotatable shaft disposed laterally of said slides, said slides having laterally extending portions through which said last named shaft extends, gears splined on said last named shaft between said laterally extending portions of said slides, gears mounted on said first named rotatable shafts and intermeshing with said last named gears, and means on said last named rotatable shaft including an indicating dial for rotating the same.

JOHN J. N. VAN HAMERSVELD.

CERTIFICATE OF CORRECTION.

Patent No. 2,189,482. February 6, 1940.

JOHN J. N. VAN HAMERSVELD.

It is hereby certified that error appears in the printed specification of the above numbered patent requiring correction as follows: Page 7, first column, lines 13, 22 and 31, claims 21, 22 and 23 respectively, before "means" second occurrence, insert the words and comma camming members,; line 24, claim 22, strike out the comma after "means" and insert the same after "members" in line 23, same claim; and that the said Letters Patent should be read with this correction therein that the same may conform to the record of the case in the Patent Office.

Signed and sealed this 12th day of March, A. D. 1940.

(Seal)

Henry Van Arsdale,
Acting Commissioner of Patents.